Dec. 19, 1961  J. DURST  3,013,479
AUTOMATIC DIAPHRAGM REGULATOR FOR
A PHOTOGRAPHIC CAMERA
Filed Feb. 20, 1958  2 Sheets-Sheet 1

INVENTOR.
Julius Durst

BY
Connolly and Hutz

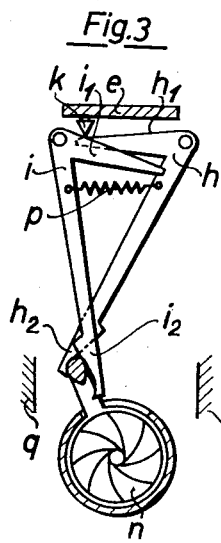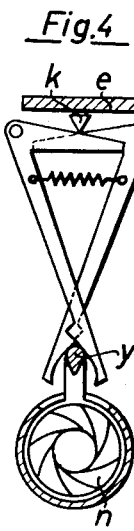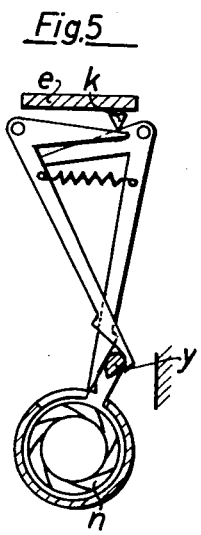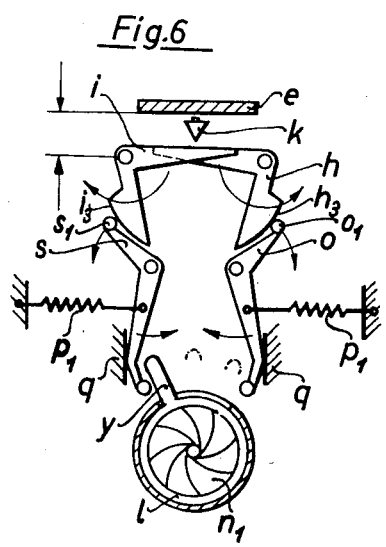

United States Patent Office 3,013,479
Patented Dec. 19, 1961

3,013,479
AUTOMATIC DIAPHRAGM REGULATOR FOR A PHOTOGRAPHIC CAMERA
Julius Durst, Bressanone, Italy, assignor to Julius Durst and Firma Durst Soc. p. A., Fabrica Machine ed Apparecchi Fototecnici, Bolzano, Italy
Filed Feb. 20, 1958, Ser. No. 716,416
Claims priority, application Italy Feb. 21, 1957
10 Claims. (Cl. 95—10)

This invention relates to an automatic device for regulating the diaphragm of a photographic camera in accordance with the ambient illumination detected by a photoelectric exposure meter incorporating a movable galvanometer element, and more particularly relates to such an automatic device which is operatively associated with a moving picture camera.

In the past the diaphragms of moving picture cameras have been manually adjusted to changing light conditions with reference to a separate exposure or light meter. The desirability of having this adjustment performed automatically has led to the use of battery-operated electric motor-driven devices for adjusting the lens diaphragm. In these devices electrical contacts or switches are operated in accordance with the indicator position of a galvanometer connected to a photoelectric cell to change the direction of movement of the motor. The reaction of this type system is so slow, however, that the adjustment of the diaphragm is not fast enough to keep up with rapidly changing light conditions. Similar diaphragm adjusting devices operated by spring mechanisms incorporate similar disadvantages.

An object of this invention is to provide a continuously operating automatic exposure regulating device which can be associated with the diaphragm of a photographic camera, particularly a moving picture camera, in which substantially no delay occurs between the times that it detects the position of the movable galvanometer element and accordingly adjusts the diaphragm.

In accordance with this invention an automatic device for regulating the lens diaphragm of a photographic camera includes a light meter incorporating a movable element, for example, the indicator or pointer of a galvanometer. A pair of separate detecting elements contact the galvanometer in such a way that one detecting element moves the diaphragm in the closing direction while the other element moves the diaphragm in the opening direction. The force for driving the automatic device is, for example, derived from a spring mechanism which transports the film. However, electric or pneumatic devices may also be used.

These detecting elements are, for example, mounted upon a carriage which is reciprocated by an eccentric which is, for example, rotated by the driving element of the camera. The detecting elements are accordingly moved periodically into contact with the galvanometer indicator or pointer.

This galvanometer or pointer is, for example, shaped to provide a knife-edged contact surface which faces the detecting arms of the detecting elements. The flat base of this knife-edge contact surface is disposed adjacent a support bar which is also, for example, reciprocated 180° out of phase with the movement of the carriage. The counter moving drives of the carriage and support bar are, for example, taken from a pair of eccentrics mounted upon a single shaft which are respectively engaged with the carriage and the support bar through yokes. This counter moving or counter pressing arrangement coordinates the movement of the detecting elements and the support bar in such a way that there is no mechanical load imposed on the galvanometer or pointer while it is clamped between the support bar and the detecting element. This freedom from load and shock is provided because the pointer is clamped between the support bar and detecting elements without being deviated from its plane or path of movement. In the clamped position the support bar is, therefore, maintained motionless whereas the detecting arms of the detecting elements move a sufficient distance to cause the actuating arms of the detecting elements to adjust the position of the lens diaphragm.

Novel features and advantages of the present invention will become apparent to one skilled in the art from the reading of the following description in conjunction with the accompanying drawings in which similar reference characters refer to similar parts and in which:

FIGS. 3, 4 and 5 are front views in elevation of a portion of the embodiment shown in FIG. 1 in various phases of operation; and FIG. 6 is a front view in elevation similar to FIGS. 3–5 of a modified embodiment of this invention.

Figure 1:
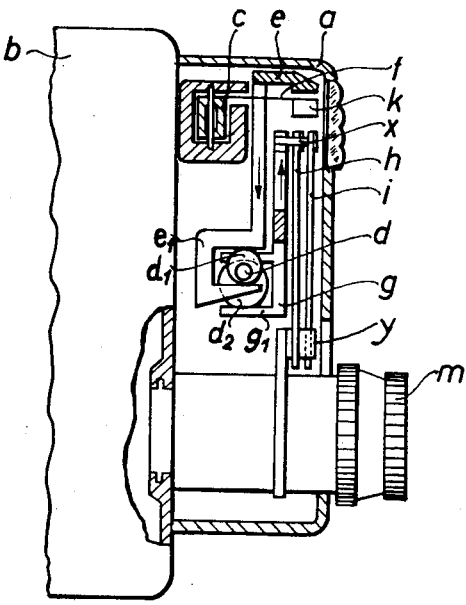
FIG. 1 is a cross-sectional side view in elevation of one embodiment of this invention.
Figure 2:
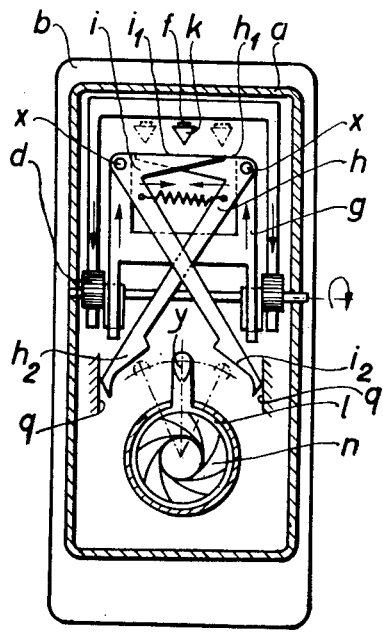
FIG. 2 is a cross-sectional front view in elevation of the embodiment shown in FIG. 1.

In FIGS. 1 and 2 is shown a photographic camera, for example a moving picture camera $b$, including a photoelectric light meter $c$, which automatically detects the ambient illumination. When moving picture camera $b$ is started, a shaft $d$ revolves, for example with a rotational frequency substantially equal to the visual frequency or a fraction of it. This rotates a pair of eccentrics $d_1$ mounted upon shaft $d$ at the same frequency. Support bar $e$ is coupled with eccentrics $d_1$ through extensions or yokes $e_1$. This reciprocates support bar $e$ toward and away from the path of movement of light meter or galvanometer pointer $f$. At the same time substantially rectangularly shaped carriage $g$ with detecting elements $h$ and $i$ movably mounted upon it are moved toward the other side of galvanometer pointer $f$. Extensions or yoke $g_1$ of carriage $g$ which engage a pair of eccentrics $d_2$ are also mounted upon shaft $d$, for example 180° out of phase with eccentrics $d_1$.

Eccentrics $d_2$ engaged with carriage $g$ are referred to herein for convenience as eccentrics, and eccentrics $d_1$ are referred to as additional eccentrics since carriage $g$ is the primary detecting agent of this device. All parts associated with carriage $g$ are, therefore, designated as primary parts while parts associated with support bar $e$ are designated as additional parts.

The contact end of galvanometer pointer $f$ is constructed and arranged, for example, to include a knife-edge contact surface $k$ whose knife edge faces detecting elements $h$ and $i$. Detecting elements $h$ and $i$ include similar but oppositely disposed detecting arms $h_1$ and $i_1$ which contact and detect the position of galvanometer pointer $f$. The other or actuating arms $i_2$ and $h_2$ of elements $i$ and $h$ contact a portion of the adjusting means of diaphragm $n$, for example, an extension $y$ of diaphragm ring $l$ mounted upon lens tube $m$. Detecting elements $h$ and $i$ are, for example, rotatably mounted at opposite sides of carriage $g$; and, for example, are equidistantly disposed outside the extremities of the path of movement of galvanometer pointer $f$.

The contacting surfaces of actuating arms $h_2$ and $i_2$ are constructed and arranged in a curved form which is, for example, constructed and arranged to precisely govern the position of diaphragm ring $l$ in accordance with the position of the indicator $f$ of light meter $c$ over its full range of travel.

Camera $b$ also includes an exposure triggering element (not shown) which is, for example, operatively engaged with the film transport device and exposure releasing device (both also not shown) and with eccentric shaft $d$. Movement of the triggering element initiates rotation of shaft $d$ prior to transport of the film and prior to opening of the shutter of the camera which automatically adjusts the diaphragm in accordance with the light meter and ambient illumination before the triggering element actuates movement and exposure of the film.

In the free position of the diaphragm $n$ shown in FIG. 2 for example, actuating arms $h_2$ and $i_2$ rest against fixed stops $q$ while diaphragm and adjusting ring $l$ and projection $y$ are free. Diaphragm $n$ and adjusting ring $l$, however, incorporate enough frictional resistance to remain in a set position. This free condition occurs with the frequency of measuring which is, for example, substantially equal to the vision frequency or more rapid. At the same time galvanometer pointer $f$ is free of detecting elements $h$ and $i$ and support bar $e$ to allow it to move in accordance with variations in the ambient illumination.

When the counter pressing or counter movement of elements $h$ and $i$ with bar $e$ commences and galvanometer pointer bearing $k$ is clamped between support bar $e$ and detecting arms $h_1$ and $i_1$, diaphragm ring $l$ is automatically moved by adjusting arms $h_2$ and $i_2$ to a position corresponding to the position of movable element pointer $f$ when it is clamped. Diaphragm $n$ then remains in this set position until the succeeding measuring impulse moves it to another position corresponding to the changing light value at that time.

FIGS. 3–5 only include certain elements in order to distinctly indicate the functions of detecting elements $h$ and $i$ and support bar $e$ and the manner in which the diaphragm $n$ is adjusted in accordance with the position of knife-edged contact surface $k$ of pointer $f$.

In FIG. 3 knife-edged contact surface $k$ of galvanometer pointer $f$ is close to the left-hand end of its path of movement where it, for example, indicates a brightly illuminated condition. Detecting elements $h$ and $i$ in this position are accordingly moved to the left in order to close diaphragm $n$.

In FIG. 4 light meter $c$ indicates a medium or average amount of light; and levers $h$ and $i$ are symmetrically disposed to adjust diaphragm $n$ to an average size.

In FIG. 5 exposure meter $c$ indicates very little or dim light which positions knife-edged bearing surface $k$ at the right end or beginning of its scale or path of movement. Detecting elements $h$ and $i$ are, therefore, deviated to the right to correspondingly open diaphragm $n$ to its maximum opened position.

FIGS. 3–5 also show a tension spring $p$ reacting between actuating arms $h_2$ and $i_2$ of elements $h$ and $i$ to maintain them in contact with fixed stops $q$ as indicated in FIG. 1 when galvanometer pointer $f$ is free.

In FIG. 6 is shown a modified embodiment of this invention in which detecting elements $h$ and $i$ contact projection $y$, of diaphragm ring $l$ through separate actuating levers $s$ and $o$. Actuating levers $s$ and $o$ are respectively maintained in contact with detecting elements $i$ and $h$ by tension springs $p_1$ reacting, for example, between fixed portions of the camera and actuating levers $s$ and $o$. Levers $s$ and $o$ make contact with detecting elements $i$ and $h$, for example, through spherical projections $s_1$ and $o_1$ which ride along adjusting surface $i_3$ and $h_3$. Adjusting surfaces $h_3$ and $i_3$ of detecting elements $h$ and $i$ are curved, for example for precisely adjusting lens diaphragm $n$ in accordance with the position of galvanometer indicator surface $k$ over its entire range of movement.

What is claimed is:

1. An automatic device for regulating the lens diaphragm of a photographic camera comprising a light meter incorporating a movable element, said diaphragm including an adjusting means, a pair of separate detecting elements, said detecting elements each including a detecting arm constructed and arranged to contact said movable element of said light meter, said detecting elements respectively including adjusting arms constructed and arranged to contact said diaphragm adjusting means for respectively opening and closing said diaphragm, movable mounting means supporting said detecting elements in positions in which their detecting arms are disposed adjacent said movable element of said light meter for actuating movement of said respective adjusting arms in opposite directions relative to said diaphragm adjusting means when said detecting arms contact said movable element of said light meter, said movable element being rotated in a plane by said light meter in accordance with the ambient illumination, a support bar disposed parallel to and adjacent said plane, said detecting elements being rotatably mounted at the other side of said plane upon a carriage, reciprocating means moving said carriage substantially perpendicularly towards and away from said plane to periodically clamp said movable element between said detecting arms and said support bar for causing said diaphragm to be adjusted in accordance with the position of said movable element when it is clamped, and resilient means reacting against said detecting elements in a direction to maintain said adjusting arms clear of said diaphragm adjusting means when said carriage moves away from said plane.

2. An automatic device as set forth in claim 1 wherein the side of said movable element adjacent said detecting arms includes a knife-edged surface for precisely governing the displacement of said detecting arms when it contacts them.

3. An automatic device as set forth in claim 1 wherein said carriage comprises a substantially rectangular element, said reciprocating means includes a rotating eccentric, and wherein a yoke is attached to said bar and operatively engaged about said eccentric for causing said bar to reciprocate in response to rotation of said eccentric.

4. An automatic device as set forth in claim 1 wherein additional reciprocating means moves said support bar towards and away from said plane of movement of said movable element 180° out of phase with said reciprocating movement of said carriage to periodically clamp said movable element between said support bar and said detecting arms.

5. An automatic device as set forth in claim 4 wherein said additional reciprocating means includes an additional eccentric means which is 180° out of phase with said eccentric means associated with said carriage, and extensions and additional yoke means couple said support bar to said additional eccentric means.

6. An automatic device as set forth in claim 1 wherein pivots rotatably mount said detecting elements upon said carriage, said pivots being equidistantly disposed outside the opposite extremities of travel of said movable element, and said detecting arms extend from said pivots towards each other.

7. An automatic device as set forth in claim 1 wherein said diaphragm adjusting means is a diaphragm ring including a projection, and said adjusting arms bear directly upon said projection.

8. An automatic device as set forth in claim 1 wherein said periodic actuating means operates at a rate providing four measurements per second.

9. An automatic device as set forth in claim 1 wherein said adjusting arms include curved surfaces which are constructed and arranged to precisely coordinate the diaphragm settings with the various positions of said movable element over its entire range of travel.

10. An automatic device as set forth in claim 1 wherein said detecting elements each include separate rotatably mounted detecting arms and actuating levers, said arms and levers contacting each other through a curved surface, said curved surface being constructed and arranged to precisely coordinate the diaphragm setting with the positions of said movable element over the entire range of movement of said movable element of said light meter.

References Cited in the file of this patent

UNITED STATES PATENTS 2,838,985     Burger et al. _____ June 17, 1958

FOREIGN PATENTS

| | | |
|---|---|---|
| 821,026 | France | Aug. 17, 1937 |
| 842,887 | Germany | Nov. 20, 1952 |
| 909,294 | Germany | Apr. 15, 1954 |